Oct. 21, 1969  F. U. STEWART ET AL  3,473,508
APPARATUS FOR APPLYING FROSTING TO CAKES
Filed Dec. 1, 1966  2 Sheets-Sheet 2
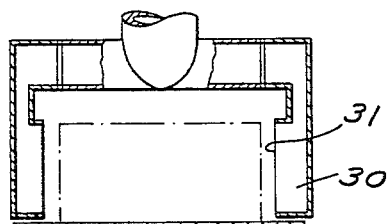
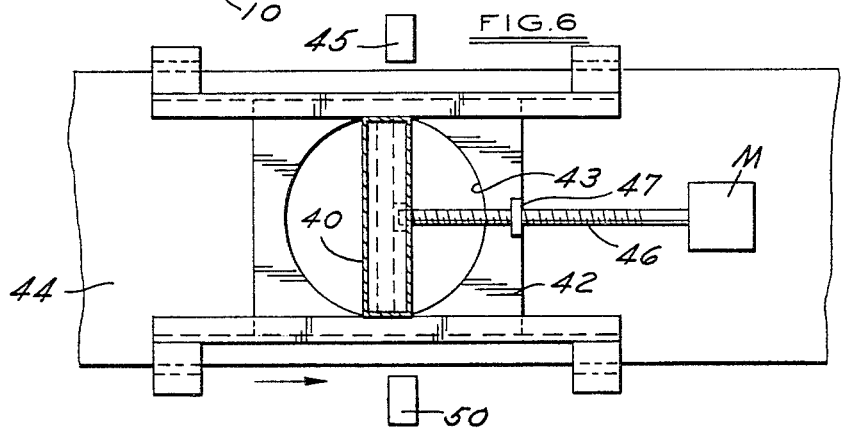
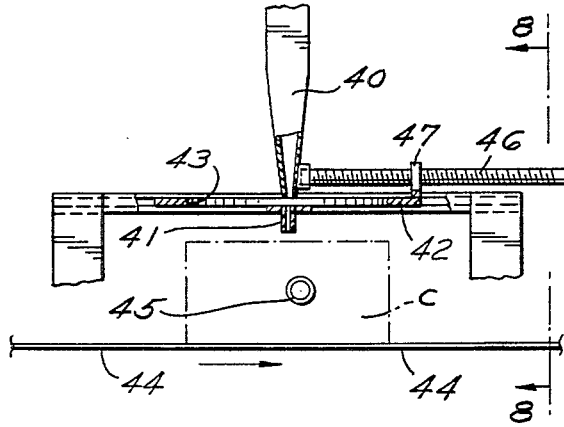
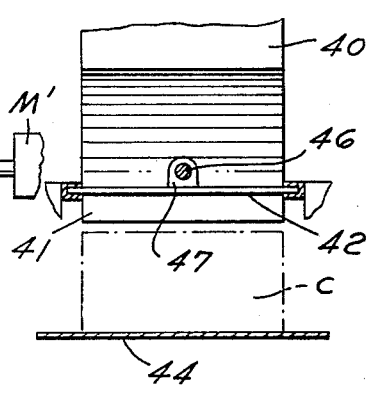
INVENTORS
FLORENTINE U. STEWART
JOSEPH A. URBAN
BY
Barnes, Kisselle, Raisch & Choate
ATTORNEYS United States Patent Office 3,473,508
Patented Oct. 21, 1969

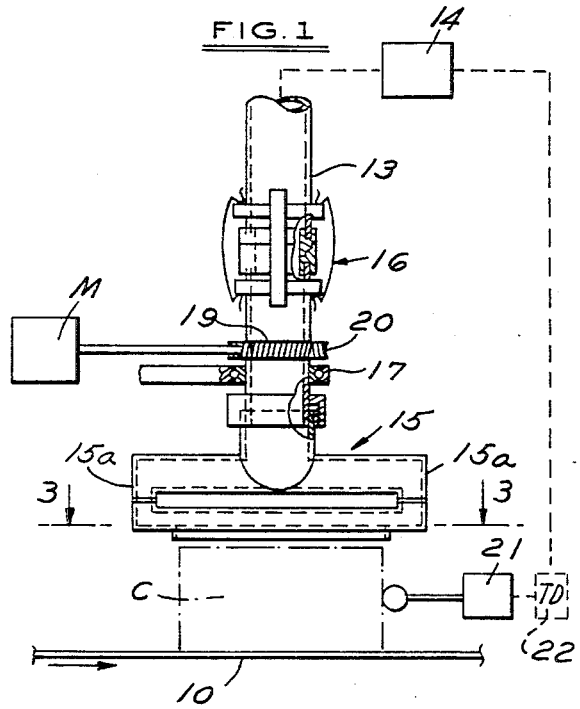
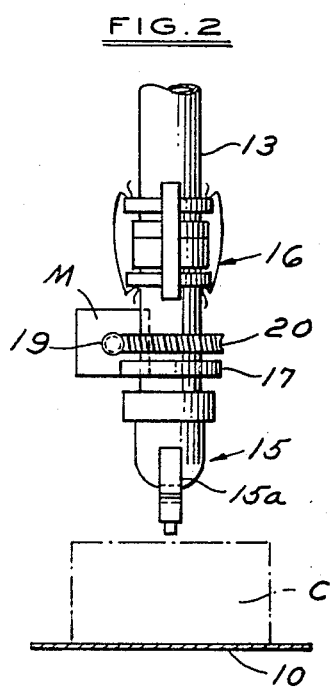
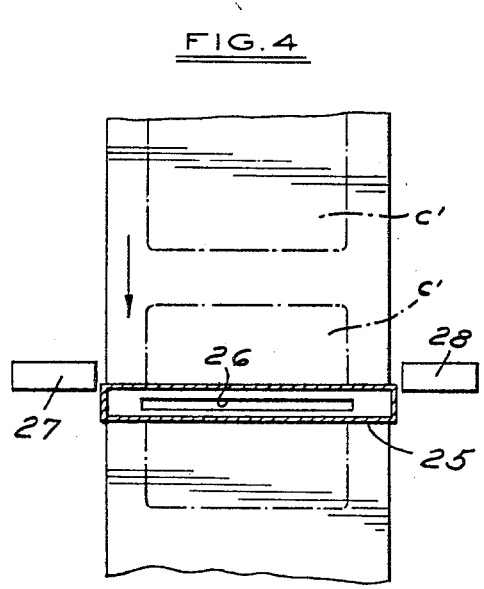
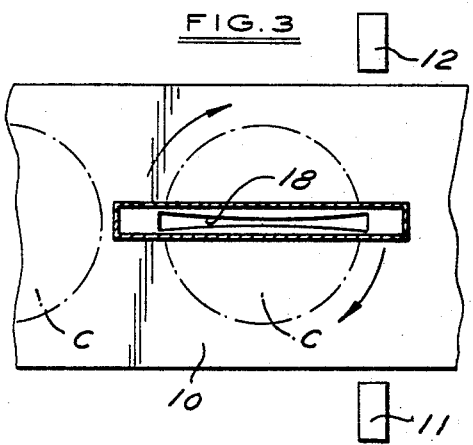

3,473,508
APPARATUS FOR APPLYING FROSTING TO CAKES
Florentine U. Stewart, 7235 Meadowlake Road, Birmingham, Mich. 48010, and Joseph A. Urban, 28529 Cleveland, Livonia, Mich. 48150
Filed Dec. 1, 1966, Ser. No. 598,333
Int. Cl. B05c 5/02; A23g 3/28
U.S. Cl. 118—2
5 Claims

ABSTRACT OF THE DISCLOSURE

A conveyor for moving cakes successively to a frosting applying station and apparatus at the station for applying frosting. In one form of apparatus, the movement of the conveyor is interrupted and one rotating nozzle applies frosting to the top, another rotating nozzle applies frosting to the sides of the cake. In another form of apparatus where the cake is generally rectangular, the cake is moved continuously and the arrival of the cake at the station energizes means for directing frosting downwardly on top of the cake. In still another form of apparatus, a control plate having the configuration of the cake as viewed from above is caused to move across a nozzle to control the flow of frosting to the top of the cake while the cake is is moving below the apparatus.

---

This invention relates to applying frosting to cakes and the like.

Among the objects of the invention are to provide apparatus for applying frosting to cakes whereby the usual manual manipulations are omitted and cakes are decorated quickly and uniformly.

Basically, the apparatus disclosed herein comprises a conveyor for moving cakes successively to a frosting applying station and apparatus at the station for applying frosting. In one form of apparatus, the movement of the conveyor is interrupted and one rotating nozzle applies frosting to the top, another rotating nozzle applies frosting to the sides of the cake. In another form of apparatus where the cake is generally rectangular, the cake is moved continuously and the arrival of the cake at the station energizes means for directing frosting downwardly on top of the cake. In still another form of apparatus, a control plate having the configuration of the cake as viewed from above is caused to move across a nozzle to control the flow of frosting to the top of the cake while the cake is moving below the apparatus.

In the drawings:

FIG. 1 is a partly diagrammatic elevational view of the apparatus embodying the invention.

FIG. 2 is a front elevational view of the apparatus.

FIG. 3 is a fragmentary sectional view taken along the line 3—3 in FIG. 1.

FIG. 4 is a view similar to FIG. 3 of a modified form of apparatus.

FIG. 5 is a front elevational view of a modified form of apparatus.

FIG. 6 is a fragmentary plan view of a further modified form of apparatus.

FIG. 7 is a fragmentary side elevational view of the apparatus shown in FIG. 6.

FIG. 8 is a sectional view taken along the line 8—8 in FIG. 7.

Referring to FIGS. 1–3, the apparatus embodying the invention comprises a conveyor 10 which carries the cakes successively through an inspection station. Upon the arrival of each cake at the inspection station, it intersects a beam of light from a light source 11 in its passage to a light sensitive cell 12 and stops the conveyor and energizes the frosting applying apparatus, as presently described. As shown in FIG. 1, the frosting applying apparatus comprises a supply pipe 13 to which frosting under pressure is supplied from a source not shown and controlled by a valve 14 shown diagrammatically. A nozzle 15 is rotatably mounted on the pipe 13 by a coupling 16 and is stabilized in its movement by a bearing 17. The nozzle 15 is hollow and is made of two hollow sections so that the frosting flows outwardly around the elbows 15a to the periphery thereof as shown by the arrows and, in turn, to an elongated slot 18. As shown in FIG. 3, the slot 18 has a length substantially equal to the diameter of the cake C and, in order to apply the frosting uniformly, increases in width from the center to the periphery thereof. Nozzle 15 is rotated by a motor M which has a gear 19 thereon that engages a bevel gear 20 on the nozzle to rotate the same.

When a cake C interrupts the light beam 11 in its passage to the light sensitive cell 12, a signal is produced which is amplified and actuates a relay 21 that controls the valve 14, the motor M and the conveyor drive. This interrupts the conveyor, opens valve 14 and starts motor M to apply frosting to the top of the cake C. After a predetermined time delay due to time delay 22 the valve 14 is closed and the motor M is de-energized and the conveyor is then again energized to carry the cake C with the frosting thereon and bring another cake C without frosting into position for applying frosting. This occurs after one revolution of the nozzle 15.

In the form of the invention shown in FIG. 4, the cakes C' which are to have frosting applied thereto are rectangular. In this form the nozzle 25 is fixed and has a slot 26 of uniform width. When a cake C' is moved into position and interrupts the light beam from light source 27 in its passage to light sensitive cell 28, a signal is produced which energizes the valve corresponding to valve 14 to thereby supply frosting to the nozzle for a predetermined time equal to the time required for the cake to pass the nozzle and, in turn, to the top of the cake.

In the form of nozzle shown in FIG. 5, provision is made for applying frosting to the sides of a round cake. In this form of nozzle, vertical legs 30 having vertical slots 31 are provided on the nozzle head so that when frosting is supplied it is applied to the sides of the cake. The nozzles of FIGS. 1 and 5 may be used at different stations along the conveyor 44.

In the form of the invention shown in FIG. 6, provision is made for decorating a cake of any cross section as viewed from above while it is continuously moved through the station. Specifically, the apparatus comprises a nozzle 40 that has an outlet 41 equal to the maximum width of the cake to be decorated. A control disk or plate 42 is reciprocated below or through the nozzle 41 and has an opening 43 corresponding to the cross section of the cake as viewed from above. As a cake C is carried by conveyor 44 to the nozzle 41, it interrupts a light beam from a source 45 creating a signal to move the control plate 42.

Initially, the control plate is in position with the solid portion of the plate interrupting the nozzle opening so that frosting is not being applied. When the signal is created, a motor M' is energized in one direction to rotate a threaded shaft 46 which has one end journalled on the nozzle 40 and is threaded through a nut 47 fixed on the control plate 42. This reciprocates the plate 42 in one direction exposing successive portions of the opening 43 so that frosting can flow downwardly under pressure to the top of the cake. As the control plate 42 is moved, it varies the effective width of the nozzle in direct relation to the shape of the cake. When the control plate reaches the solid portion, its movement is interrupted because of the passage of the light beam 45 in uninterrupted fashion to its light sensitive cell 50. When the next cake interrupts the light beam, the motor M' is energized in the reverse direction to return the control plate 42 at the same speed as the conveyor 44 and applies frosting to the top of a succeeding cake. Thus the control plate in effect follows the movement of the cake as the cake moves below the nozzle.

I claim:

1. In an apparatus for applying frosting to cakes and the like, the combination comprising
   a conveyor for moving cakes successively through a station,
   means at said station for applying frosting to a cake,
   and means responsive to the presence of a cake at said station for actuating said means for applying said frosting,
   said frosting applying means comprising
   a nozzle having an opening extending transversely of said conveyor and having a width substantially equal to the width of the cake to be frosted,
   a control disk reciprocable transversely of said nozzle,
   said control disk having an opening therein corresponding substantially to the configuration of the cake to be frosted as viewed from above.

2. The combination set forth in claim 1 including means for moving said control disk longitudinally of the conveyor.

3. The combination set forth in claim 2 wherein means for moving said control disk reciprocates said disk in one direction across said nozzle to apply frosting to one cake and in an opposite direction across said nozzle to apply frosting to a succeeding cake.

4. An apparatus for applying frosting to cakes and the like comprising
   a nozzle having an opening extending transversely with the width substantially equal to the width of the cake to be frosted,
   means for moving cakes successively beneath the nozzle,
   a control disk reciprocable transversely of the nozzle and parallel to the path of the cakes,
   said control disk having an opening therein corresponding substantially to the configuration of the cake to be frosted as viewed from above,
   means for reciprocating the control disk parallel to the path of movement of each cake so that said control disk moves longitudinally in the direction of movement of one cake and in the opposite direction of movement of a succeeding cake.

5. In an apparatus for applying frosting to cakes and the like, the combination comprising
   a frosting distributing nozzle,
   means for supplying frosting to said nozzle under pressure,
   and means for rotating said nozzle,
   said nozzle comprising
   an elongated slot extending generally horizontally,
   said slot being centered substantially over a cake positioned on said conveyor at said station,
   said slot progressively increasing in width from the center to the periphery,
   and means for supplying frosting to the ends of each nozzle so that the frosting flows radially inwardly and is supplied to said nozzle slot.

References Cited

UNITED STATES PATENTS

| | | | |
|---|---|---|---|
| 1,859,971 | 5/1932 | Keck | 118—24 X |
| 3,001,485 | 9/1961 | Czik | 107—27 X |
| 1,358,716 | 11/1920 | Fisher et al. | 107—27 |
| 1,618,053 | 2/1927 | Cates | 107—27 X |
| 2,424,949 | 7/1947 | White | 118—25 X |
| 2,281,169 | 4/1942 | Pattison | 118—323 X |
| 2,553,191 | 5/1951 | Hettinger | 118—320 X |
| 3,343,504 | 9/1967 | Beik | 107—27 X |

WALTER A. SCHEEL, Primary Examiner

JOHN P. McINTOSH, Assistant Examiner

U.S. Cl. X.R.

118—25